US006876696B1

United States Patent
Goodson et al.

(10) Patent No.: US 6,876,696 B1
(45) Date of Patent: Apr. 5, 2005

(54) TIMING DEVICE AND METHOD USING A TIMING EQUALIZER FILTER FOR A DIGITAL COMMUNICATIONS SYSTEMS

(75) Inventors: Richard L. Goodson, Huntsville, AL (US); Steven R. Blackwell, Huntsville, AL (US); Ayman Ghobrial, Huntsville, AL (US); Cynthia Lin, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 759 days.

(21) Appl. No.: 09/668,856

(22) Filed: Sep. 25, 2000

Related U.S. Application Data

(60) Provisional application No. 60/156,039, filed on Sep. 24, 1999, and provisional application No. 60/156,037, filed on Sep. 24, 1999.

(51) Int. Cl.[7] .................................................. H04B 1/38
(52) U.S. Cl. ........................ 375/219; 375/232; 375/341; 375/354; 375/231; 375/355; 375/220; 370/497
(58) Field of Search .............................. 375/232, 341, 375/354, 231, 355, 220, 219; 370/497

(56) References Cited

U.S. PATENT DOCUMENTS

| | | | | |
|---|---|---|---|---|
| 4,780,883 A | * | 10/1988 | O'Connor et al. ......... | 375/219 |
| 5,163,066 A | * | 11/1992 | Cupo et al. ................. | 375/232 |
| 5,353,312 A | * | 10/1994 | Cupo et al. ................. | 375/354 |
| 5,636,244 A | * | 6/1997 | Goodson et al. ............ | 375/231 |
| 5,703,905 A | * | 12/1997 | Langberg .................... | 375/232 |
| 5,793,821 A | * | 8/1998 | Norrell et al. .............. | 375/355 |
| 5,999,542 A | * | 12/1999 | Turner et al. ............... | 370/497 |
| 6,614,838 B1 | * | 9/2003 | Bremer ....................... | 375/220 |
| 6,618,451 B1 | * | 9/2003 | Gonikberg .................. | 375/341 |

OTHER PUBLICATIONS

S. Qureshi; Fast Start-Up Equalization with Periodic Training Sequences; Sep. 1977; IEEE Transcations on Information Theory; vol. IT-23, No. 5; pp. 553-563.*

* cited by examiner

*Primary Examiner*—Stephen Chin
*Assistant Examiner*—Sudhanshu C. Pathak
(74) *Attorney, Agent, or Firm*—Waddey & Patterson, P.C.; Mark J. Patterson

(57) ABSTRACT

A method of training and operating a dual-duplex, four-wire communications system to provide for time alignment in the receivers of data that is time aligned in the transmitters, even in the presence of a differential transmission delay in the wire pairs. In a training mode, a known sequence of training data is concurrently sent across each wire pair such that equalizers in the receivers are forced to train together. After the equalizers have been trained to eliminate the differential delay, the system is switched to a data mode.

19 Claims, 8 Drawing Sheets ured to allow correct de-framing of the data at the receiver. In the
TIMING DEVICE AND METHOD USING A TIMING EQUALIZER FILTER FOR A DIGITAL COMMUNICATIONS SYSTEMS This application claims benefit of co-pending Provisional U.S. patent application Ser. No. 60/156,039 filed Sep. 24, 1999, entitled "Method and Apparatus for Duplex Transmission on a Four Wire Communication System" and Provisional U.S. patent application Ser. No. 60/156,037 filed Sep. 24, 1999, entitled "Timing Device and Method Using A Timing Equalizer Filter for a Digital Communications System."

BACKGROUND OF THE INVENTION

This invention relates generally to dual-duplex, four-wire data communications systems.

More particularly, this invention pertains to devices, systems and methods for effectively canceling differential transmission delays associated with data communications across a pair of communications loops.

A complex issue that arises in dual-duplex, four-wire data communications systems is the separation (occurring at the sending end) and reconstruction (occurring at the receiving end) of data between the two wire pairs (loops). The incoming data to be transmitted must be split (usually evenly) between the two wire pairs at the input to the transmitters, and a single output data stream must be reconstructed from the two received data streams at the output of the receivers. The reconstruction process is made more complicated in a four wire (A and B loop) system if there are differential time delays introduced by each of the loops, such that data symbols that are time aligned at the transmitters in the central office transceiver are not time aligned when they arrive at the receivers in the remote transceiver.

Two approaches for separation and reconstruction of transmitted data used in the prior art are: (1) transmission of data in blocks or frames on each wire pair; or (2) symbol-by-symbol interleaving of data between the pairs, where a "symbol" is a unique token conveying information. For example, in quadrature amplitude modulation (QAM), where the data signal is both phase and amplitude modulated, each unique combination of amplitude and phase is a "symbol." In the first prior art approach, significant bandwidth, referred to as framing overhead, may be required to allow correct de-framing of the data at the receiver. In the second approach, the framing overhead may be avoided by carefully measuring delays during training but this increases the complexity of the training sequence itself. In either of these prior art approaches, interleaving or framing data buffers must be used in the transmitter, receiver, or in both. The use of such buffers introduces undesirable latency into the system.

What is needed, then, is a data communications device and method that can cancel the effects of differential transmission delay in a dual-duplex, four-wire data communications system without increasing framing overhead, and without significantly adding to system latency.

SUMMARY OF THE INVENTION

The present invention provides a device and method for reliable continuous communications of data in a dual-duplex, four-wire communications system where there may be a differential transmission delay between two communications loops connecting a central office and a remote location. In one embodiment, the invention forms an integral part of a system for full duplex transmission of a DS0 signal (64 Kbps), with an overhead of 800 bits per second, providing a data rate per wire pair of 32.4 Kbps.

In one embodiment, the device comprises a dual channel transceiver having A and B channel transmitters functionally coupled to a data input through a data splitter. A and B channel receivers in the transceiver are coupled to a data output through a data combiner. Each of the A and B channel transmitters are connected to corresponding A and B channel data scramblers and data mappers at their respective input stages and each of the A and B channel receivers are connected to respective A and B channel demappers and descramblers at their respective output stages.

In accordance with one novel feature of the invention, when the transceiver is operated in a Training mode, the input to the A channel scrambler is functionally coupled to a source of training data so that a known sequence of training data can be transmitted. The input to the B channel mapper is switched from the output of the B channel scrambler to the output of the A channel scrambler so that the training data can be transmitted concurrently across the A and B channels.

In one embodiment of the invention, each A and B channel receiver includes a both a decision feedback equalizer (DFE) and a linear equalizer (LEQ). During the Training mode, the data inputs to the A and B channel DFE's are switched to concurrently receive the same training data from a training scrambler and mapper. Thus, in accordance with one novel feature of the invention, the A and B channel receivers are forced during the Training mode to train together such that symbols that are transmitted together (time aligned in the transmitter) will always be time aligned after equalization in the receiver. In this way, the transmitter can simply accept sufficient bits of data to represent two symbols and allocate half of the bits to each pair. In the receiver, the symbols are output concurrently and are reconstructed into a single data stream without any additional buffering.

The method of this invention does not require additional framing or delay to reconstruct the data stream from the A and B channels because the end-to-end delays associated with the A and B channels output bits are adapted to be identical. The device and method can operate for extended periods across conventional telephone line pairs without the use of data buffers, and without requiring framing overhead or precise differential delay measurements.

DESCRIPTION OF THE PREFERRED EMBODIMENTS

Figure 1:
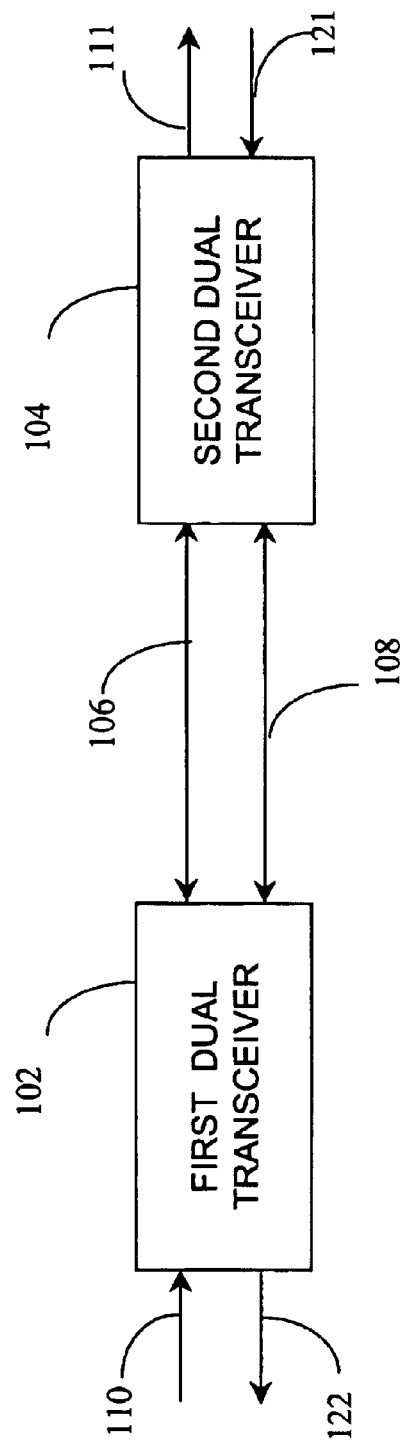
FIG. 1 is a block diagram showing first and second dual transceivers used in a dual-duplex, four-wire data communications system in accordance with the present invention.

FIG. 1 illustrates in block diagram form a dual-duplex, four wire data communications system in accordance with the invention, having two dual transceivers 102, 104 coupled by two wire pairs 106, 108 for a total of 4 wires. In one embodiment of the system, each wire pair 106, 108 is part of a conventional telephone line local loop (Loop A and Loop B on FIGS. 2 through 5) wherein the first dual transceiver 102 is located at a telephone company central office (the "C-end") and the second dual transceiver 104 is located at a remote site (the "R-end"). Thus, first dual transceiver 102 has a data input 110 connected to a source of data (not shown) that is to be transmitted, and a data output 122 where the data received from second dual transceiver 104 is provided. Similarly, second dual transceiver 104 has a data input 121 connected to an external data source (not shown) and a data output 111 where data received from first dual transceiver 102 is provided. In one embodiment, the system of FIG. 1 can be used for full duplex transmission of a standard DS0 signal having a nominal data rate of 64 Kbps with an overhead of 800 bps, with each wire pair (or loop) 106, 108 carrying 32.4 Kbps.

Figure 2:
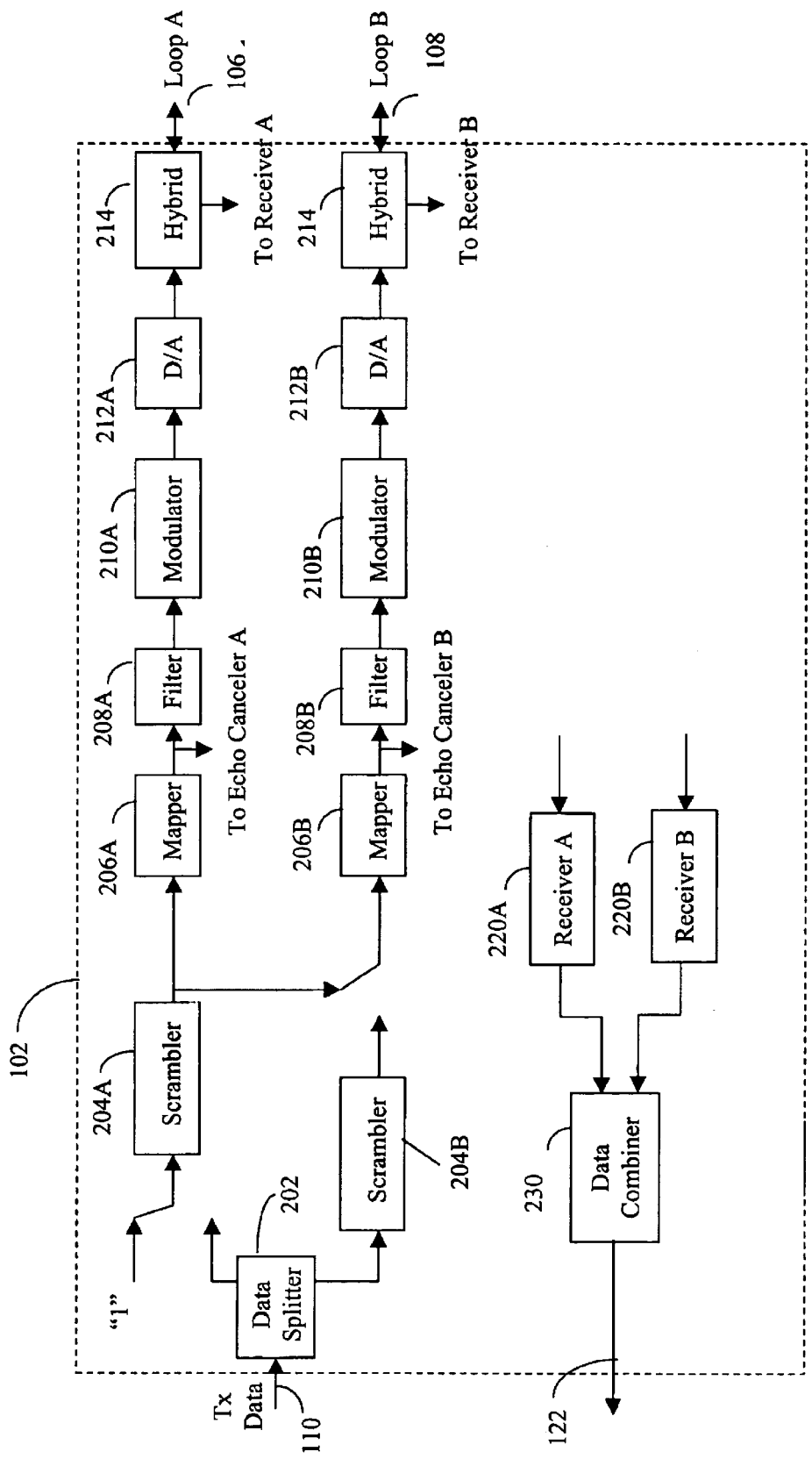
FIG. 2 is a block diagram of a first embodiment of the dual transceivers used in the system of FIG. 1, showing the A and B channel transmitters set to operate in a Training mode.

A block diagram of a first embodiment of the first dual transceiver 102 is shown in FIG. 2. In all material respects the dual transceivers 102, 104 are functionally identical. The data input 110 is connected to a data splitter 202 that splits the incoming data between A and B channel transmitters associated with data channels A and B. Each A and B channel and A and B loop 106, 108 has its own transmitter but the two sections are functionally identical. Thus, the transmitter for each channel includes a data mapper 206, a shaping filter 208, modulator 210, and a D/A converter 212. The input to the A channel mapper 206A is connected to the output of A channel scrambler 204A, while the input to B channel mapper 206B is switched, as described below, between the outputs of A and B channel scramblers 204A and 204B. The outputs of D/A converters 212A and 212B are connected to inputs on hybrid 214. The hybrid 214 includes interfaces to couple the transmitters and receivers to loop A (106) and loop B (108) and receiver outputs to receivers 220A and 220B. Thus, the hybrid 214 is a conventional device that directs the incoming and outgoing data to the proper transmitter and receiver stage inside the transceiver. The respective outputs from A and B channel receivers 220A and 220B are connected to a data combiner 230. The output of data combiner 230 is connected to first transceiver output 122. The output of the data mapper 206 can also be communicated to an A channel echo canceller (not shown).

Each transmitter in dual transceivers 102, 104 operates in three modes: Pre-training, Training, and Data. In the Pre-training mode, the transceivers detect the presence or absence of load coils on each loop A and B and there is an exchange of pre-training system information between the dual transceivers 102, 104 using FSK modulation. This information can include determining which is the A channel and which is the B channel and estimating line losses for purposes of setting the automatic gain control. In the Training mode, uncoded 4-QAM signals are transferred between the transceivers 102, 104 over the two loops A and B as will be described in further detail below. During the Data mode, user data is transferred between a central office data node (C-end) and a data communications device at the remote location (R-end).

Where the incoming user data is part of a 64 Kbps DS0 signal, the data is split on a symbol-by-symbol basis between channels A and B. During the Data mode, odd data bits are sent to the A channel transmitter through scrambler 204A and even data bits are send to the B channel transmitter through scrambler 204B. In accordance with one novel aspect of the invention, during the Training mode (as shown in FIG. 2) the input of scrambler 204A is switched from the data splitter 202 to a source of training data, so that the training data for the A and B channels is identical, as each channel is driven by scrambler 204A.

In one embodiment, the system is operated in a coded 1024-QAM mode and the data splitter 202 splits a total of 18 bits for each symbol between the A and B channels. The data splitting is performed by numbering the 18 bits from 0 to 17, then causing the splitter 202 to send the even-numbered bits to channel A, and the odd-numbered bits to channel B. Other methods of data splitting could also be applied, such as sending the first 9 bits of data to channel A and the second 9 bits to channel B.

Timing is important to proper functioning of the system. Therefore, the dual transceivers 102 and 104 are always clocked together in both transmitters and receivers. The C-end clock signal is derived from the data network or from an internal timing reference (not shown). The R-end clock signal is derived from received timing from one of the wire pairs, such as on loop A (106).

Figure 3:
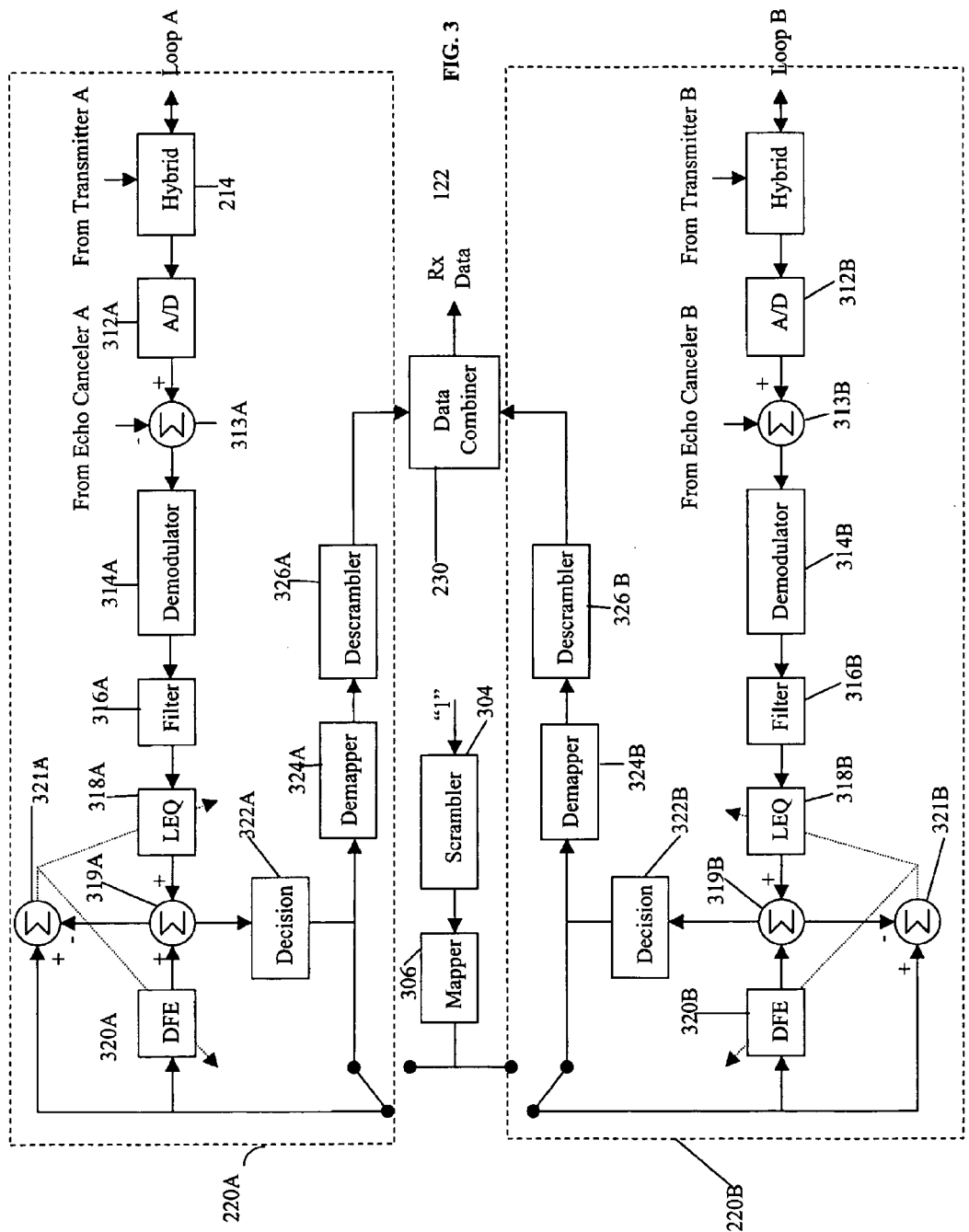
FIG. 3 is a block diagram of a first embodiment of the receiver section of one of the dual transceivers used in the system of FIG. 1, with the A and B channel receivers set to operate in a Data or Decision Directed mode.

A block diagram of a first embodiment of the first receiver section 220 is shown in FIG. 3. As is the case with the transmit sections, the relevant portions of the receive sections of the two channels are functionally identical. The A channel receiver output from the hybrid 214 is connected to the input of an A/D converter 312A. The signal from A/D 312A is summed in summing stage 313A with the signal from A channel echo canceller (not shown). The resulting signal is then demodulated in demodulator 314A, and after passing through filter 316A, is processed in a linear equalizer (LEQ) 322A. The primary function of the LEQ is to compensate for phase and amplitude distortion of the data signal caused by variable electrical characteristics of the loop, such as that introduced by the length of the loop and/or by the presence of load coils. The equalized data is then summed in summing stage 319A with the output from a decision feedback equalizer (DFE) 320A. The summing stage 319A is coupled to a second summing stage 321A and to a decision module 322A that selects the received data symbol from the received data. The output of the decision module 322A is coupled to demapper 324A and descrambler 326A before the data is sent to combiner 230.

In the Data mode as shown on FIG. 3, the decision module 322A is coupled to DFE 320A and summing stage 321A. The summing stage 321A sums output from decision module 322A with a signal from summing stage 319A. The output of the summing stage 321A is an error signal used to adapt the equalizer 318A and DFE 320A, as is known to those skilled in the art, using conventional equalizer algorithms.

In the Training mode, the data input to DFE 320A (and to DFE 320B in receiver 220B) is switched to the output of training mapper 306, which is coupled to a training scrambler 304 to provide table directed training of the system. Thus, in accordance with yet another aspect of the invention, both equalizers 318A and 318B are trained using the same table directing training scrambler 304. Using this method, the received symbol timing between the A and B channels is always concurrent, even if the two loops A and B are of different electrical length or otherwise have different electrical parameters that can effect signal latency. Because the received symbols are concurrent by construction, the associated data bits may be recombined to reconstruct the original data stream without buffering.

As described above, the device and method of this invention preferably uses a form of "table directed" training whereby a known data sequence is transmitted and then regenerated in the receiver. In the embodiments of FIGS. 1–5, the training data comprises a sequence of 1's so that the output sequence can be easily regenerated. As is known to those of skill in the art, the scramblers 204A, 204B function as pseudo-random number generators to randomize the input sequence. This prevents training and decision problems that can arise when the input data is constant. In the embodiment of the device and method described herein, the equivalent of a "table" is generated by training scrambler 304 and mapper 306 (FIG. 3). Those of skill in the art will recognize that other table directed or data directed training techniques can be used.

The data combiner 230 works in a manner opposite of the data splitter 202 used in the transmitter 102. If the A channel bits are numbered 0,2,4, . . . 16, and the B channel B bits are numbered 1,3,5, . . . 17, then the two channels are combined by putting the bits in numerical order.

The described method is effective in systems where the maximum differential delay between loops A and B (106, 108) is sufficiently small that the delay can be accounted for in LEQ's 318A, 318B. In one embodiment of the system, the maximum differential delay is estimated to be less than one symbol. The differential delay is automatically factored in by B channel LEQ 318B in the placement of the "center tap" (equalizer coefficent) that grows during the Training mode. As delay difference increases, the center tap will grow too close to the edge of the equalizer, thereby impairing performance. If the differential delay exceeds the maximum tolerable limit (e.g., several sysmbols) the LEQ 318B will simply not acquire a solution. The maximum difference in latency that can be tolerated in a particular embodiment is dependent on the number of coefficients in the linear equalizer. The disclosed embodiment can tolerate several symbols worth of differential latency, or around 1 msec.

Figure 4:
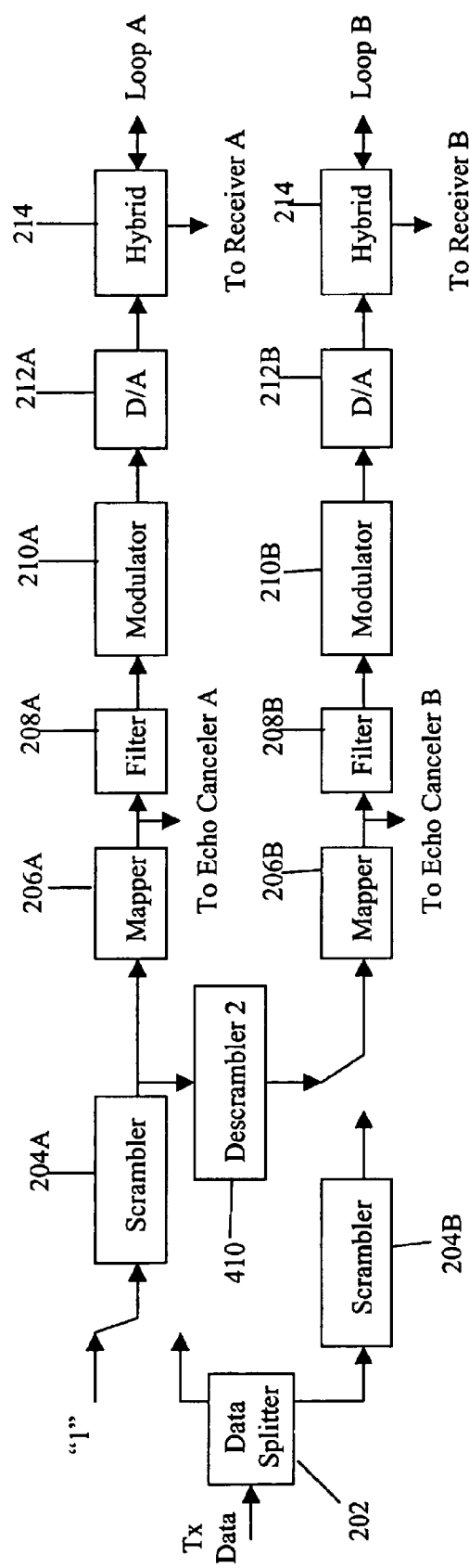
FIG. 4 is a block diagram of a second embodiment of the transmitter section of the dual transceivers used in system of FIG. 1, with the A and B channel transmitters set to operate in a Training mode.
Figure 5:
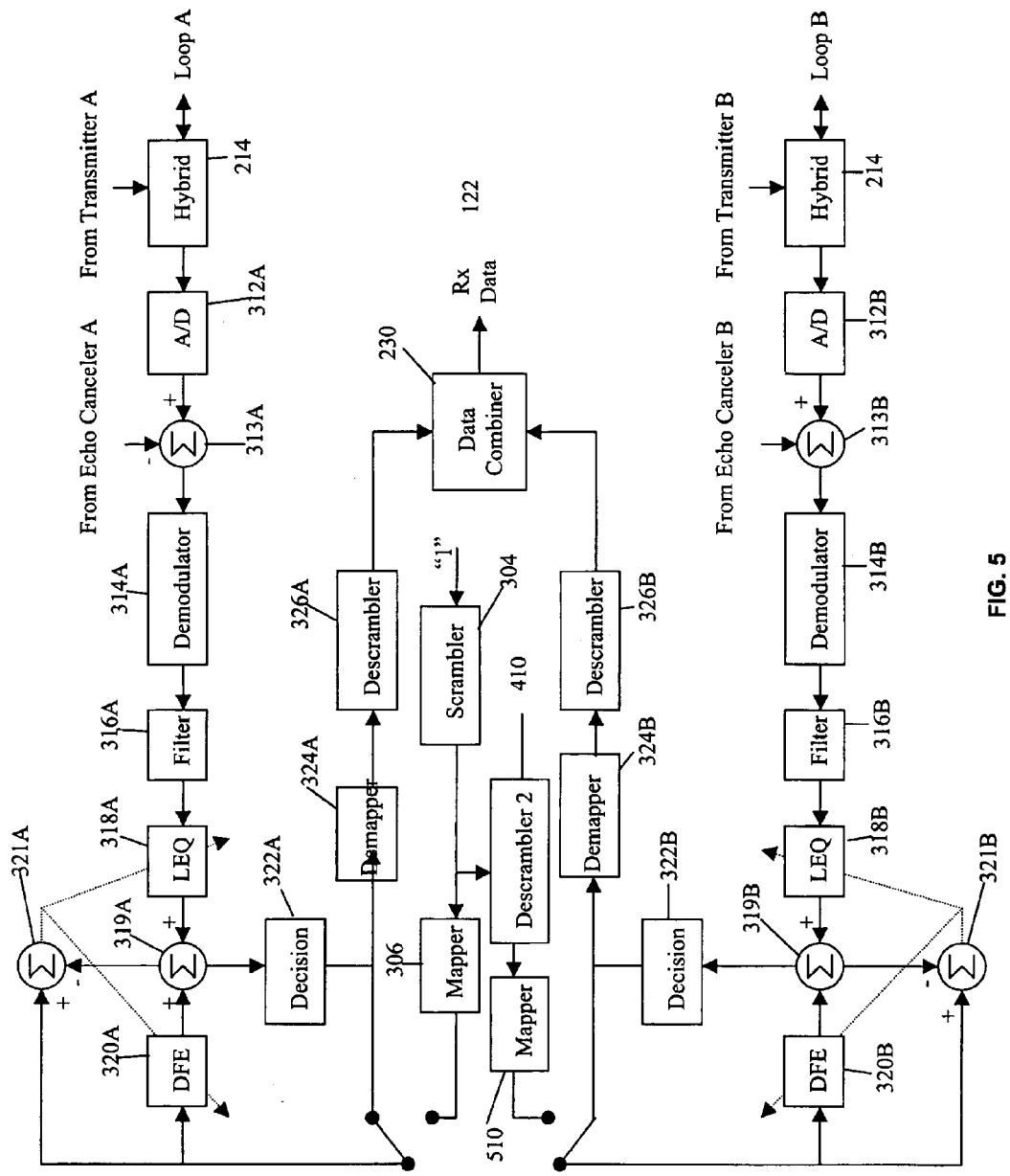
FIG. 5 is a block diagram of a second embodiment of the receiver section of the dual transceivers used in the system of FIG. 1, with the A and B channel receivers set to operate in a Data or Decision Directed mode.

FIGS. 4 and 5 show alternate embodiments of the dual transceivers 102, 104. In these alternative embodiments, a second descrambler 410 and demapper stage 510 are added for generating Training mode data for Loop B. This enhancement addresses a problem that could occur in the simpler implementations shown and described with reference to FIGS. 2 and 3. In the first embodiment (FIGS. 2 and 3), both loops A and B (106, 108) are trained using identical symbol streams in the training data. This renders the receivers 220A, 220B incapable of estimating and reducing the effects of crosstalk between the wire pairs. The embodiment of FIGS. 4 and 5 resolves this problem by descrambling the transmit symbols using a polynomial that is unrelated to the scrambler polynomial. In so doing, the data for channel B/Loop B is randomized with respect to channel A/Loop A in a predictable way, such that the table directed training can still occur in the receiver.

Figure 6:
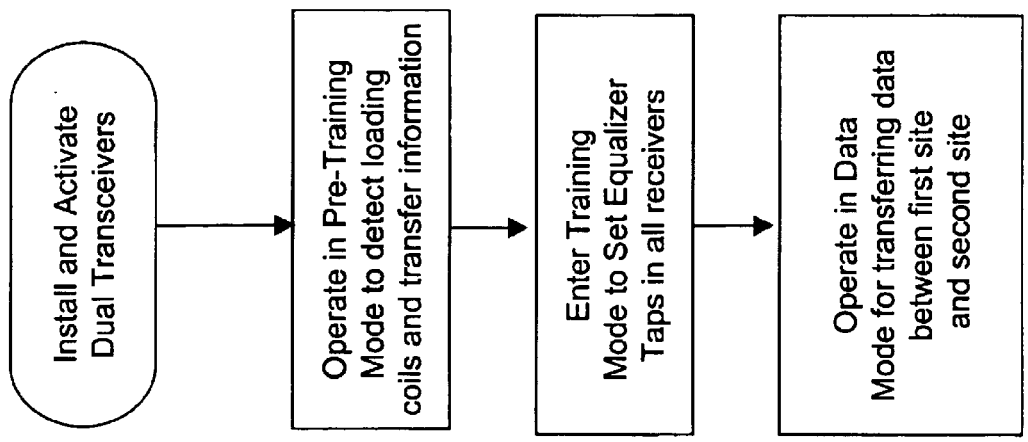
FIG. 6 is a flow chart showing the modes of operation of the dual transceivers in accordance with the present invention

FIG. 6 illustrates the modes of operation of the dual transceivers 102, 104 of the present invention. At start-up, the device enters a Pre-training mode. There is an exchange of tones, followed by an FSK-modulated exchange of pre-training data. The pre-training data is used to assign channel A and channel B, to determine whether there are load coils present or not, and to estimate the line losses for setting the automatic gain control. The Pre-training mode and Training mode are active during startup. The Data mode is functional during data transfers between the C-end and the R-end. The transceivers 102, 104 may be used in an "always on" environment and remain on for extended periods of time unless interrupted for maintenance, power failure or some other reason.

Figure 7:
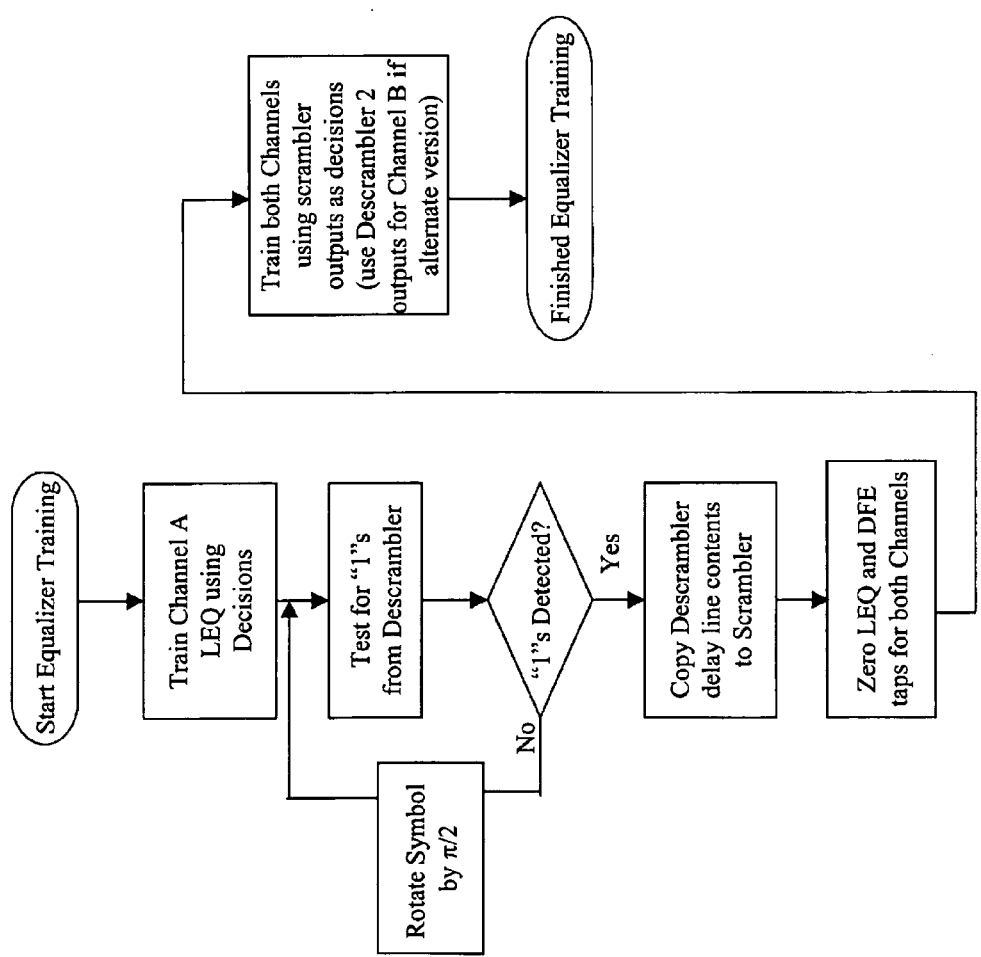
FIG. 7 is a flow chart of an equalizer tap setting algorithm in accordance with the present invention.

FIG. 7 contains a flow diagram of a typical equalizer training sequence used in the Training mode, in accordance with the present invention. During equalizer training, the transmitter corresponding to the opposite end from the receiver sends the same sequence of symbols (scrambled 1's) on each A and B channel. In the second embodiment of FIGS. 4 and 5, the scrambled 1's for the channel B transmitter are passed through the second descrambler 410, producing an uncorrelated (but derivable) symbol sequence. Thus, in the embodiment of FIGS. 4 and 5, the A and B channels are using different sequences in the Training data. However, the channel B sequence is derived from the channel A sequence, so that training can still occur.

As mentioned above, in a preferred embodiment of the system, table directed training is used. At the beginning of the Training mode, the channel A receiver trains with the channel B receiver, for all practical purposes, turned off. The channel A receiver is provided with a simple compromise equalizer LEQ 318A that allows it to begin to make decisions about the transmitted symbols. Thus, at the beginning of the Training mode, channel A is trained with a decision directed train. The system knows what sequence of training symbols is being transmitted because the polynomials used in the scrambler 204A are known. Once the equalizer makes enough correct decisions (determined by the bit length of the descrambler), the information from the descrambler is forced into the scrambler. The LEQ and DFE coefficients for channels A and B are reset by, for example, being zeroed out. Both channels A and B are now training using the acquired set of symbols, with the scrambler outputs as the decisions. In the embodiment of FIGS. 4 and 5, the second descrambler 410 outputs are used. In this novel method, table directed training is used to force synchronization between the A and B channels. By forcing the same training data through each channel together in this manner, signals that are time aligned in the transmitter in the Data mode will always be time aligned in the receiver. Consequently, the transmitted data stream can be reconstructed in the receiver without any additional buffering.

Thus, in accordance with one novel feature of the invention, receiver parameters, such as equalizer coefficients, are adjusted during the Training mode to functionally eliminate any differential delay between loop A and loop B. These adjustments are made by sending identical training data down the A and B channels and forcing the two channels to train together. The operational result of these adjustments is that any delay introduced into the system by one loop is also created in the other loop so that data signals that are time aligned in the transmitter are also time aligned in the receiver.

During the Training mode, uncoded 4-QAM modulation is used. In a preferred embodiment, more than one constellation will be used. The coded 1024-QAM constellation is the largest used for the Data mode.

At the highest data rate, the payload of the system is 64 kbps and the overhead in 800 bps. Transmission reach is less than 50 kft, or with insertion loss less than 10 dB at 1004 Hz. Several symbols of differential delay can be accounted for (e.g., 500 usec to 1 msec), depending on the length of the linear equalizer.

Figure 8:
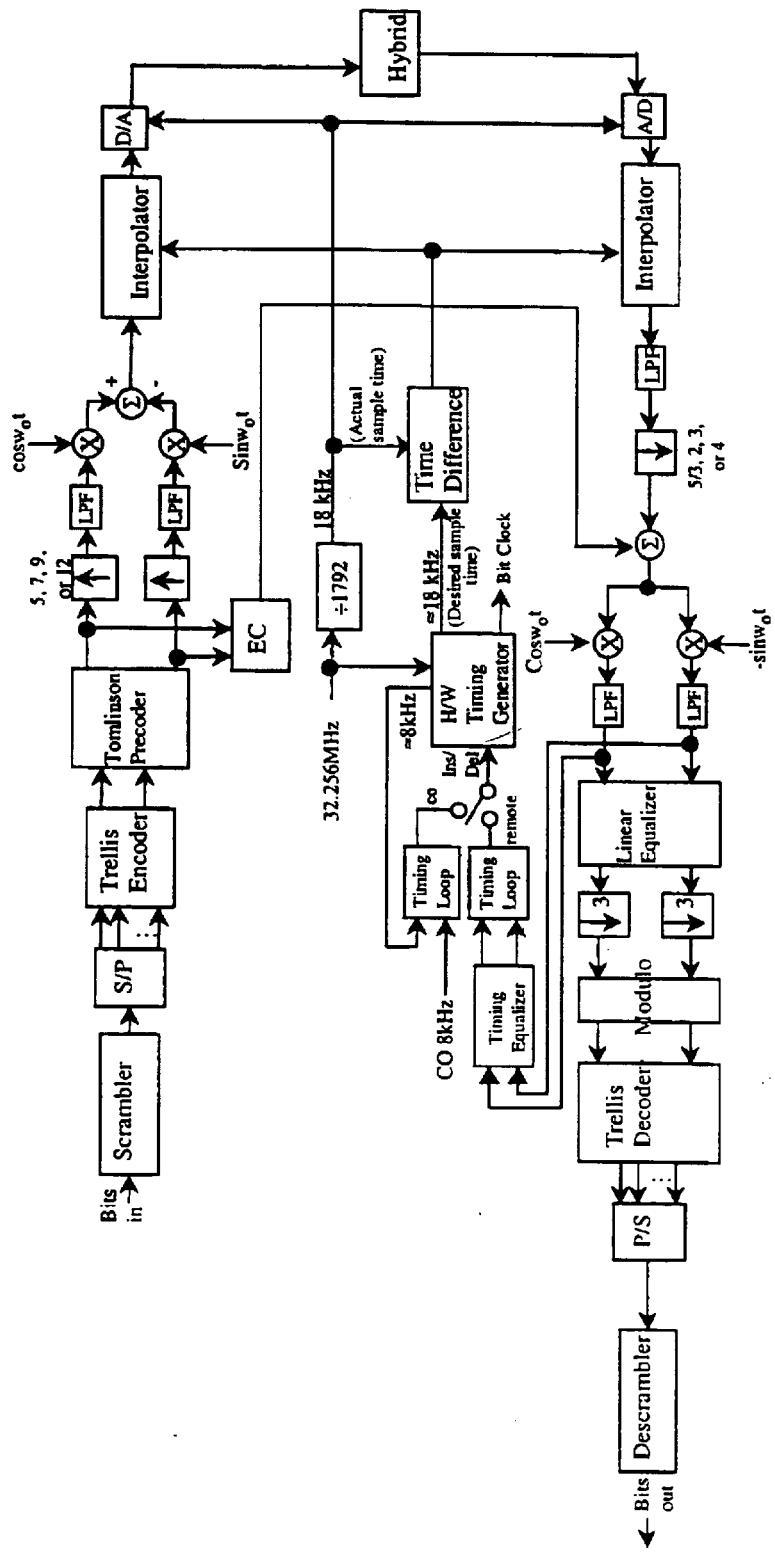
FIG. 8 is a more detailed block diagram of one embodiment of a transceiver that can be used to implement the method of the present invention.

Those of skill in the art will recognize that additional functional components, conventional in nature, may be added to a transceiver implementation of the present invention to provide improved performance, such as a Tomlinson pre-coder, and a trellis encoder/decoder. One embodiment of a transceiver that includes such functional components is illustrated in FIG. 8, wherein the upper portion of the diagram shows the transmitter and the lower portion shows the receiver. The transceiver of FIG. 8 can be located at either the remote end or the central office end of the loop. In the central office end, the timing is locked to the 8 kHz reference clock. In the remote end, the timing is locked to the received signal, hence indirectly locked to the central office 8 kHz reference clock.

The data input to the transmitter begins with a scrambler, followed by a serial to parallel converter which converts from a serial bit stream into the number of parallel bits required by the trellis encoder. The trellis encoder receives K parallel bits every symbol time and outputs a complex discrete value or voltage. The trellis encoder output passes through a Tomlinson precoder, also producing a complex discrete value (voltage). The Tomlinson precoder is a non-linear filter that simultaneously pre-equalizes the channel and whitens the output. The Tomlinson precoder output passes through a QAM modulator, providing a real discrete value. In addition, the Tomlinson precoder output passes through the echo canceller to produce the real echo replica. An interpolator receives the output of the modulator and changes the time base from the central office timing to the local 18 kHz timing. The output from the interpolator is then sent through a digital-to-analog converter to the analog hybrid.

The receiver input begins with an A/D converter that produces a real, discrete value, followed by an interpolator to change the time base from the local 18 kHz timing to the central office timing. The interpolator output is supplied to a decimator, which reduces the sample rate to three times the symbol rate, and then the real discrete echo replica is subtracted. After subtracting the echo replica, the signal passes through a QAM demodulator, producing a complex discrete value, followed by a linear equalizer and a modulo device. The resulting complex discrete value is decimated by 3 (reducing the sample rate to the symbol rate) and passed into the trellis decoder. The output of the trellis decoder is K parallel bits that are converted to a serial stream and passed out of the receiver through the descrambler.

The timing loop and the echo canceller are functionally positioned between the transmitter and the receiver. The echo canceller models the echo channel between the output of the Tomlinson precoder and the input to the echo replica subtractor. The timing loop drives the hardware timing generator to produce a signal which is phase and frequency locked to the central office end, which in turn is used to produce the bit and symbol clocks, and to determine the correct interpolator setting.

It will be apparent to those of skill in the art that the method of this invention can be extended to three or more wire pairs. The method can also be used with loops that have load coils attached.

Thus, although there have been described particular embodiments of the present invention of a new and useful Method and Apparatus for Duplex Transmission on a Four Wire Communication System, it is not intended that such references be construed as limitations upon the scope of this invention except as set forth in the following claims.

What is claimed is:

1. A method of operating a dual-duplex communications system having A and B channel transmitters in a first dual transceiver operatively coupled through A and B loops to corresponding A and B channel receivers in a second dual transceiver, the A and B channel receivers including respective A and B channel equalizers, the method comprising the steps of:
   a. operating the system in a training mode to initialize timing synchronization between the first and second transceivers, wherein the training mode includes the steps of
      directing identical channel training data to the respective A and B channel transmitters in the first transceiver, wherein the training data includes a sequence of symbols,
      concurrently transmitting the training data across the A and B loops to the A and B channel receivers in the second transceiver
      training the A channel equalizer in the A channel receiver using decision directed training;
      detecting the sequence of symbols at the output of a first descrambler coupled to the A channel receiver;
      copying the detected sequence of symbols as contents of the first descrambler to a training scrambler such that the training scrambler is driven by the known sequence of symbols:
      training the first equalizer and the second equalizer with the output of the training scrambler using table directed training: and
   b. switching the system to operate in a data mode.

2. The method of claim 1 wherein the step of training of the A and B channel equalizers includes adjusting equalizer coefficients.

3. In a data communications system having central office A and B channel transmitters and receivers coupled by A and B loops to corresponding remote A and B channel transmitters and receivers, a method of time aligning in the central office and remote A and B channel receivers data signals that are time aligned in the corresponding remote and central office A and B transmitters, the method comprising automatically adjusting electrical parameters in at least one of the A and B channel receivers during a training mode such that any transmission delay introduced by one of the A or B loops is effectively created in the other A or B channel so that when the system is operated in a data mode there is no differential signal transmission delay operable between the A and B channels, and wherein during the training mode, a known sequence of A channel training data is transmitted across loon A while concurrently sending B channel training data across loop B, and wherein the B channel training data is different from but mathematically derived from the A channel training data.

4. The method of claim 3 wherein the step of adjusting electrical parameters in a least one of the A and B channel receivers during the training mode includes adjusting equalizer coefficients in the receiver using table directed training.

5. A method for time synchronizing the reception of first symbols from a first transmitter functionally coupled by a first loop to a first receiver and second symbols from a second transmitter functionally coupled by a second loop to a second receiver the method comprising the steps of:
   driving the first transmitter by a known first sequence of symbols and the second transmitter by a second sequence of symbols that are different from but derived from the first sequence of symbols;

training a first equalizer in the first receiver using decision directed training;

detecting the known first sequence of symbols at the output of a first descrambler coupled to the first receiver;

copying the detected sequence of symbols as contents of the first descrambler to a training scrambler such that the training scrambler is driven by the known sequence of symbols; and training the first equalizer and the second equalizer with the output of the training scrambler using table directed training.

6. The method of claim 5 where the known sequence of symbols is produced by a sequence of "1's".

7. The method of claim 5 where the symbols are generated using uncoded 4 QAM.

8. The method of claim 5 further comprising switching to a data mode upon completion of training by the training scrambler.

9. The method of claim 8 wherein a data rate on the first channel is substantially equal to a data rate on the second channel.

10. The method of claim 8 further comprising the steps of receiving an input data stream from a central site; and separating the input data stream into a first input stream for the first transmitter and a second input data for the second transmitter modulating the first input stream in the first transmitter forming a first modulated signal;

modulating the second input stream in the second transmitter forming a second modulated signal;

transmitting the first and second modulated signals over the respective first and second loops.

11. The method of claim 10 further comprising the steps of;

demodulating the first modulated signal in the first receiver;

demodulating the second modulated signal in the second receiver; and combining the first and demodulated signals forming an output data stream.

12. A method of transferring a data stream from a central location to a remote location using a first wire pair and a second wire pair, where the wire pairs may have different transmission delays, the method comprising:

simultaneously transmitting, during an initial training mode, training data across the first and second wire pairs, the training data comprising first and second sequences of scrambled ones, the second sequence of scrambled ones being different from the first sequence of scrambled ones;

training a first linear equalizer in a first receiver and a second linear equalizer in a second receiver using the first and second sequences of scrambled ones;

switching to a data mode when the linear equalizers are trained;

separating an input data stream into first and second data streams;

modulating the first data stream in a first transmitter and the second data stream in a second transmitter;

transmitting the output of the first transmitter across the first pair of wires and the output of the second transmitter across the second pair of wires;

receiving the output of the first transmitter at a first receiver and the output of the second transmitter at a second receiver;

generating a first receiver data stream and a second data receiver stream; and combining the first receiver data stream and the second data receiver stream to form an output data stream.

13. A device for communicating data across A and B loops characterized by having a differential transmission delay between first and second ends of the loops, the device comprising:

a. A and B channel transmitters functionally coupled to the first ends of the corresponding A and B loops;

b. A and B channel receivers functionally coupled to the second ends of the corresponding A and B loops;

c. training means to automatically adjust electrical parameters in at least one of the A and B channel receives when the device is operated in the training mode so that when the device is operated in the data mode, the differential transmission delay between the A and B loops effectively canceled; and d. the A channel transmitter operative in a training mode to transmit a first known sequence of training data to the A channel receiver and a second sequence of training data to the B channel receiver, the second sequence of training data being different from but derived from the first sequence of training data.

14. The device of claim 13 wherein the A and B channel receivers further comprise respective A and B channel equalizers, the electrical parameters that are adjusted during the training mode include coefficients in at least one of the A and B channel equalizers, the training means includes a training scrambler functionally coupled to the A and B channel receivers during the training mode, and the training means is operable to provide table directed training of the A and B channel equalizers during the training mode.

15. A device for transferring a user data stream from a central location to a remote location using a first wire pair and a second wire pair, where the first and second wire pairs may have different transmission delays, the device comprising:

a first transmitter and a second transmitter operable, in a training mode, to send respective first and second scrambled sequences of symbols across the first and second wire pairs, the second sequence of symbols being different from the first sequence of symbols;

a first receiver and a second receiver operatively coupled respectively to the first wire pair and to the second wire pair, the first and second receivers comprising respective first and second linear equalizers, the linear equalizers having equalizer coefficients adjustable during the training mode;

means for switching the device to a data mode upon termination of the training mode;

a data separator for separating the user data stream into a first data stream sent to the first transmitter and into a second data stream sent to the second transmitter;

a data combiner for combining the first receiver data stream and the second receiver data stream forming an output data stream.

16. A method of operating a data transmission system in which a single user data stream is separated into multiple data streams for transmission by corresponding multiple data transmitters over multiple wire pairs for reconstruction into the single user data stream in corresponding multiple data receivers comprising the steps of:

operating the system in a training mode by concurrently sending different sequences of training data from, each of the transmitters across the wire pairs to each of the receivers, whereby the sequence of training data sent across one of the wire pairs is mathematically derived from the sequence of training data sent across the other wire pairs, using the training data to cause timing adjustments in at least some of the receivers so that any differential transmission delay associated with the different wire pairs is effectively eliminated; and operating the system in a data mode using the timing adjustments set during the training mode so that user data that is time aligned in the multiple data streams in the transmitters is also time aligned in the receivers.

17. The method of claim 16 wherein the step of causing timing adjustments in the receivers includes adjusting receiver equalizer coefficients.

18. A method of training equalizers in A and B channel receivers in a data communications system that includes a data splitter coupled to A and B channel transmitters that are operatively linked to the A and B channel receivers across first and second two wire pairs forming A and B loops, and where the A and B channel receivers include respective A and B channel descramblers functionally connected between A and B channel decision modules and a data combiner, the method comprising the steps of:

a. sending a known sequence of training symbols from the A channel transmitter to the A channel receiver;

b. decision training the A channel equalizer by adjusting A channel equalizer coefficients while testing at the A channel descrambler for correct decisions made by the A channel decision module corresponding to the known sequence of training symbols;

c. copying training information from the A channel descrambler to a training scrambler having an output functionally linked to the A and B channel equalizers;

d. concurrently sending the known sequence of training symbols from the A and B channel transmitters to the A and B channel receivers;

e. training the A and B channel equalizers together by using outputs from the A and B channel scramblers as decisions and adjusting equalizer coefficients in at least one of the A and B channel equalizers until the A and B channel decision modules are making correct decisions in accordance with the known sequence of training symbols, and the data combiner is providing an output in which data that is time aligned at the data splitter is also time aligned at the data combiner even in the presence of a differential transmission delay between the A and B loops.

19. A method of training A and B channel equalizers in respective A and B channel receivers in a data communications system having first and second loops, the method comprising the steps of:

a. transmitting a first sequence of training data on the first loop;

b. transmitting a second sequence of training data on the second loop, the second sequence of training data being different from and derived from the first sequence of training data;

c. using the A channel receiver to make decisions about the first sequence of training data;

d. using the decisions made in the A channel receiver to train the A channel equalizer;

e. using the decisions made in the A channel receiver to derive a B channel training sequence for the B channel equalizer; and f. using the B channel training sequence to train the B channel equalizer.

* * * * *